(No Model.)

W. W. GRIER.
VEHICLE RUNNING GEAR.

No. 296,406. Patented Apr. 8, 1884.

Witnesses
L. C. Fitler
R. C. Wrenshall

Inventor
William W. Grier
by his attys
Bakewell & Kerr

UNITED STATES PATENT OFFICE.

WILLIAM W. GRIER, OF HULTON, PENNSYLVANIA.

VEHICLE RUNNING-GEAR.

SPECIFICATION forming part of Letters Patent No. 296,406, dated April 8, 1884.

Application filed February 7, 1884. (No model.)

*To all whom it may concern:*

Be it known that I, WILLIAM W. GRIER, of Hulton, in the county of Allegheny and State of Pennsylvania, have invented a new and useful Improvement in Vehicle Running-Gear; and I do hereby declare the following to be a full, clear, and exact description thereof, reference being had to the accompanying drawings, forming part of this specification, in which—

Figure 1:
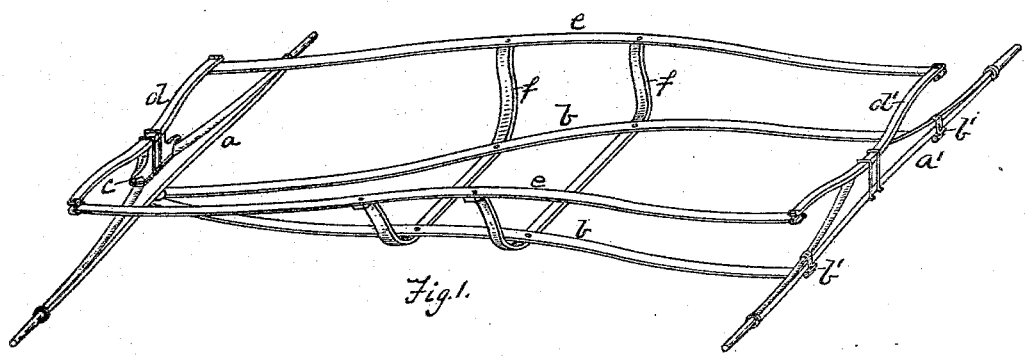
Figure 2:
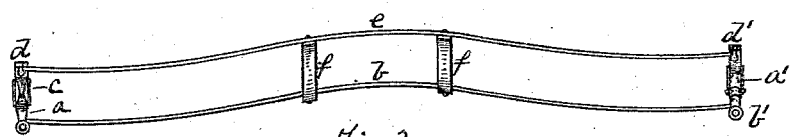

Figure 1 is a perspective view of my improved vehicle running-gear; and Fig. 2 is a side view, the wheels being omitted.

My invention consists in a modification and improvement of the vehicle-gear patented to M. T. Jackson on August 8, 1876, No. 180,886, and which is known to the trade as the "Dexter Queen Gear;" and it consists in attaching the ends of the side springs to cross-springs instead of to the head-block and top of the rear axle, as heretofore.

To enable others skilled in the art to make and use my invention, I will now describe it by reference to the drawings, where—

$a\ a'$ indicate the axles; $b\ b$, the lower springs, which are fastened to the rear axle at $b'$, preferably on the under side, by means of shackles, and at the front end to the under side of the front axle at the lower end of the king-bolt. Fastened to the center of the rear axle, $a'$, and to the top of a short head-block, $c$, upon the front axle, $a$, are cross-springs $d\ d'$. The side springs, $e$, are fastened to the springs $d\ d'$ at or near their ends, and the springs $b\ b$ and $e\ e$ are united by one or more bent cross-bars, $f\ f$, at or near the middle of the gear. This construction, being in a "no-perch" vehicle of the class named, has all the advantages of elasticity and ease of motion found in such a construction; and in addition thereto the elasticity and softness of movement which is due to the substitution of the half-springs $d\ d'$ for the rigid head-block and rear axle heretofore used for the attachment of the ends of the parallel side springs. The union of the springs $b\ b$ and $e\ e$ by means of the cross-bars $f$ prevents the side surging of the gear in case the weight is suddenly thrown to one side. My improved gear gives a remarkably easy and elastic movement to the body of the vehicle, and relieves it from all jerks and strains.

What I claim as my invention, and desire to secure by Letters Patent, is—

The combination, in a no-perch vehicle-gear, of diagonal springs connected to the middle of the front axle and to the rear axle at or near its ends, with cross-springs fastened to the head-block and at the top of the rear axle, side springs connected to the ends of the cross-springs, and braces uniting the diagonal and side springs, substantially as and for the purposes described.

In testimony whereof I have hereunto set my hand.

WILLIAM W. GRIER.

Witnesses:
 THOMAS B. KERR,
 WILLIAM B. CORWIN.